United States Patent [19]
Milberger et al.

[11] 3,904,653

[45] Sept. 9, 1975

[54] SYNTHESIS OF MALEIC ANHYDRIDE

[75] Inventors: Ernest C. Milberger, Solon; Serge R. Dolhyj, Parma, both of Ohio

[73] Assignee: The Standard Oil Company, Cleveland, Ohio

[22] Filed: May 5, 1972

[21] Appl. No.: 250,660

[52] U.S. Cl. .............................. 260/346.8; 252/470
[51] Int. Cl.² ..................................... C07D 307/60
[58] Field of Search ..................... 260/346.8, 533 N

[56] References Cited
UNITED STATES PATENTS
3,702,868  11/1972  Santangelo et al. ............. 260/533 R
FOREIGN PATENTS OR APPLICATIONS
1,157,117  7/1969  United Kingdom

OTHER PUBLICATIONS

Ionita et al., Chem. Abstracts (1969) 114953; Romanian Pat. No. 51,772, July 26, 1969.

*Primary Examiner*—Henry R. Jiles
*Assistant Examiner*—Bernard I. Dentz
*Attorney, Agent, or Firm*—Herbert D. Knudsen

[57] ABSTRACT

Catalysts containing antimony and molybdenum are promoted by the addition of iron or vanadium or mixture thereof to give very desirable catalysts for the preparation of maleic anhydride from 1,3-butadiene, n-butylenes, crotonaldehyde and furan.

10 Claims, No Drawings

SYNTHESIS OF MALEIC ANHYDRIDE

CROSS REFERENCE TO RELATED APPLICATION

This application is a continuation of the work done in our prior application with Harley F. Hardman, U.S. Ser. No. 177,105, filed Sept. 1, 1971.

BACKGROUND OF THE INVENTION

Maleic anhydride is normally prepared by the oxidation of benzene. This process creates unnecessary waste in that two carbon atoms are oxidized to useless products.

The oxidation of four carbon reactants to produce maleic anhydride eliminates this waste. This process has been conducted before in the art using various catalysts, see for example Chemical Abstracts Volume 71, 114953j and Japanese Pat. No. 7125736. The present invention uses different catalysts which have superior activity and selectivity.

SUMMARY OF THE INVENTION

It has now been discovered by the present invention that in the oxidation of a four-carbon reactant selected from 1,3-butadiene, n-butenes, crotonaldehyde, furan or mixture thereof to produce maleic anhydride by contacting a mixture the four-carbon reactant and molecular oxygen with an oxidation catalyst at a temperature of about 250° to about 600°C. the desirability of the reaction is substantially enhanced by using as the oxidation catalyst a catalyst containing $$Sb_a Mo_b V_c Fe_d Z_e O_x$$

wherein Z is a metal or an oxide of molybdenum, tungsten, magnesium, aluminum and nickel and wherein
 $a$ and $b$ are numbers from about 1 to about 9,
 $c$, $d$ and $e$ are numbers from 0 to about 1,
 $c + d$ is not zero, and
 $x$ is a number which satisfies the valence requirements of the other elements present.

This new promoted catalyst gives excellent yields of clean product.

The important aspect of the present invention is the catalyst employed. Specifically, since the basic antimony-molybdenum catalyst is found in our prior application, the central feature of the present invention is the fact that vanadium and iron have been discovered to be very desirable promoters of the basic catalyst. Although the role of these promoters is not clearly understood, the effect of their incorporation into the catalyst has been observed in our experiments.

The effect of incorporating vanadium into the basic antimony-molybdenum catalyst is the significant increase in selectivity accompanied by an increase in activity. With vanadium, a cleaner product is obtained which is easier to purify by ordinary separation techniques.

The incorporation of iron into the catalyst has been observed to substantially increase the throughput of a given reactor. This is accomplished because the amount of molecular oxygen required in the reaction is reduced.

A surprising aspect of the present invention is that both vanadium and iron can be added to the antimony-molybdenum catalyst, and the desirable effect of vanadium alone and iron alone is essentially retained. Thus, the promoted catalyst gives a cleaner reaction with greater throughput.

As noted, the catalyst employed in the present invention may be any catalyst delimited by the formula above. Preferred are catalysts wherein $c$ or $d$ of the formula is independently about 0.01 to about 0.5. Of greatest interest, of course, are catalysts wherein both $c$ and $d$ are about 0.01 to about 0.5.

Also preferred in the present invention are those catalysts wherein Z is molybdenum or tungsten. As added to the catalysts these materials are usually metals, and after the catalyst is prepared, this metal may be at least partially present in the form of an oxide or oxide complex. The exact nature of these materials in the final catalyst and their role in the catalyst is not clearly understood.

The catalysts which are prepared using molybdenum and tungsten metal are preferably those wherein $a$ and $b$ are numbers of about 2 to about 8 and $e$ is a number of about 0.001 to about 0.2. The catalysts of greatest interest in the invention are those which include in addition to these limitations, the limitation that both $c$ and $d$ are about 0.01 to about 0.5.

The catalysts of the present invention are suitably prepared by techniques which are similar to our prior application mentioned in the "Cross Reference to Related Applications" or by techniques disclosed in the art, such as coprecipitation or impregnation. These techniques may vary widely and an acceptable catalyst can be obtained.

One method of preparing the catalysts involves mixing the respective oxides of antimony, molybdenum and the other components of the catalyst. This mixing may be carried out in a blender or a ball mill. One of the better methods of mixing the oxides is to slurry antimony trioxide, molybdenum trioxide and the other oxides in water. In these preparations of the catalyst, a blue-green color is observed in the mixture. The product obtained is then dried, normally by evaporation, and the dried product is usually calcined at a temperature which is below about 1,000°F.

A reproducible method for preparing the catalyst involves refluxing an aqueous suspension of antimony oxide, molybdenum oxide and other metal oxides for a period of about a half an hour to about 16 hours or more. The amount of water used in this preparation is not critical and may range from about 500 to about 2,000 ml. per mole of the molybdenum present. During the reflux, the catalyst slurry usually darkens to a deep olive green or black color. After reflux, the slurry is dried and calcined in the usual manner. Optionally, rather than preparing the catalysts by adding all the components together at one time, the oxides of molybdenum and antimony can be refluxed, and the other materials can be added later. Alternatively, the other components, such as vanadium and iron, are impregnated into the catalyst of antimony and molybdenum after its preparation.

The most preferred process for preparing the catalyst involves the reaction of molybdenum trioxide with a reducing agent, such as a metal. This reducing substance transforms at least some of the molybdenum in the +6 valence state to a lower valence state. A wide range of reducing agents can be employed to effect the desired reduction. Representative examples of these reducing agents include: finely divided metals such as molybdenum, tungsten, magnesium, aluminum or nickel; ionic reducing agents, such as stannous ion and ferrous ion; and other reducing agents such as sulfur dioxide and hydrazine. The use of powdered metals, especially molybdenum and tungsten, is preferred.

When metals are used as reducing agents, the amount of metal reacted may vary widely. Suitably, about 0.01 to about 0.2 atoms of metal are employed per mole of molybdenum trioxide.

The most desirable method of conducting the reduction and a part of the invention is the reflux of an aqueous slurry of the molybdenum trioxide and the metal. When the color of the slurry changes to blue or blue-green, the reflux can be terminated. The catalyst is prepared from this slurry by adding antimony oxide and other desired elements to the slurry. Alternatively, the other catalytic components can be present in the slurry during the reaction of the metal and the molybdenum oxide.

The catalyst of the present invention may be supported on a carrier material, such as silica, zicronia, calcium-stabilized zirconia, titania, alumina, thoria, silicon carbide, clay, diatomaceous earth, aluminum phosphate and the like. The carrier may comprise up to about 95% by weight or more of the total catalyst composition. Also, in addition to these components enumerated, the catalyst may contain additional elements, such as the oxides or metals of Bi, P, Co, Cr, W, Cu, Ag, Sn, Ti, Mn, Zn Ba, K and the like.

The catalyst is activated by calcining it in air at a temperature of about 700° to about 1,000°F. for a period of up to five hours or more. A preferred activation of the catalyst is accomplished by passing a mixture of steam and air or air alone over the catalyst at a temperature of about 800°F. for a period of about 1 to 5 hours.

The other parameters of the reaction other than the catalyst are known and are not significantly altered by the application of the present invention. However, the preferred limits of these variables as applied to the present invention are briefly discussed below.

The organic reactants may be any of the four-carbon compounds selected from the group of 1,3-butadiene, n-butenes, crotonaldehyde and furan. The preferred organic reactant is 1,3-butadiene.

In the reaction, the organic compound is normally mixed with molecular oxygen and passed over the oxidation catalyst. The molecular oxygen in the invention is usually present in the form of air.

An important aspect of the present invention is that use of iron in the catalyst reduces the amount of molecular oxygen required in the reaction. Thus, in the present invention, air to reactant ratios of about 12 to about 20 are easily employed when the catalyst is promoted with iron. In prior reactions, the amount of air was substantially greater.

In addition to the molecular oxygen, other materials, such as steam, nitrogen, carbon oxides and the like, may be charged to the reactor as diluents. The reaction may be conducted at atmospheric, subatmospheric or superatmospheric pressure, with superatmospheric pressure normally being employed. The apparent contact time may vary widely, but usually the contact time is between about 1 and 50 seconds.

The temperature of the reaction is dependent upon a number of factors in the reaction such as the reactants, the presence of diluents and the particular catalyst employed. Normally, the reaction temperature is maintained between about 250° and about 600°C., with temperatures of about 325° to about 450°C. being preferred.

Under these conditions, antimony-molybdenum catalysts containing vanadium and iron are capable of giving improved yields, cleaner reactions and increased capacity when used in the oxidation reactions of the present invention.

SPECIFIC EMBODIMENTS

COMPARATIVE EXAMPLE A — Reaction of 1,3-butadiene using an $SbMo_3O_x+W°_{0.06}$ catalyst of our prior application In a 20 cc. fixed bed reactor consisting of a length of ½ inch stainless steel tubing equipped with a full length ⅛ inch axial thermowell, 1,3-butadiene was reacted with air in the proportions specified in Table I. The reaction was conducted in the presence of an oxidation catalyst of $SbMo_3O_x+W°_{0.06}$.

The catalyst was prepared by refluxing an aqueous slurry containing about two liters of waters, 432 g. of $MoO_3$ and 11.03 g. of W° metal powder. The reaction was continued for two hours and the color turned to a deep blue. To the slurry was then added 145.7 g. of $Sb_2O_3$. Upon additional stirring and heating, the slurry turned to a greenish black. The slurry was dried on a double drum drier, and the product recovered was dried at 110°C. over night. The catalyst was then ground and screened to 20–30, mesh. To the reactor, 20 cc. of this catalyst was charged, and the catalyst in the reactor was heated at 800°F. in a stream of air for two hours before reactants were charged.

The reactants were charged to the reactor in the proportions shown in Table I at an apparent contact time of about 3.3 seconds and the temperature of the heating jacket surrounding the reactor was maintained at 690°, ±10°F. The maleic anhydride and acrylic acid were recovered and analyzed. Maleic anhydride was determined by gravimetric precipitation as described in *J. Am Chem. Soc.* 57, 1390 (1935).

The results are stated in terms of percent per pass conversion which is defined as $$\frac{\text{Grams of carbon as maleic anhydride or acrylic acid obtained}}{\text{Grams of carbon as organic starting material fed}} \times 100$$

EXAMPLES 1–10 — Reaction of 1,3-butadiene using various catalysts of the invention In the same manner shown in Comparative Example A, various catalysts of the invention were used to prepare maleic anhydride and acrylic acid from 1,3-butadiene. The catalysts for these experiments were prepared as follows:

EXAMPLE 1

$SbMo_3V_{0.1}O_x+W°_{0.06}$ — An aqueous slurry containing 108 g. of $MoO_3$, 2.76 g. of W° metal powder and 2.27 g. of $V_2O_5$ was prepared and stirred at reflux for two hours. A deep blue color was observed. To the slurry, 36.4 g. of $Sb_2O_3$ was added, and the mixture was stirred at reflux for 2 hours. A black color was observed. The catalyst was recovered from the slurry and activated as described in Comparative Example A. In this and subsequent catalyst preparations, it was observed that the addition of the promoters of the present invention did not substantially affect the color changes noted above.

EXAMPLE 2

$SbMo_3V_{0.2}O_x + W°_{0.06}$ — The catalyst preparation was the same as Example 1, except that 4.55 g. of $V_2O_5$ was added to the initial slurry.

EXAMPLES 3 & 4

$SbMo_3Fe_{0.1}O_x + W°_{0.06}$ — This catalyst was prepared as shown in Example 1, except that the vanadium oxide was replaced by 2.0 g. of $Fe_2O_3$.

EXAMPLE 5

$SbMo_3Fe_{0.3}O_x + W°_{0.06}$ — This catalyst was prepared in the same manner as shown in Examples 3 and 4 except that 6.00 g. of $Fe_2O_3$ were employed.

EXAMPLE 6

$SbMo_3Fe_{0.1}V_{0.1}O_x + W°_{0.06}$ — This catalyst was prepared in the same manner as Examples 3 and 4 except that 2.27 g. of $V_2O_5$ was added to the initial slurry.

EXAMPLES 7 & 8

$SbMo_3Fe_{0.2}V_{0.1}O_x + W°_{0.06}$ — This catalyst was prepared in the same manner as shown in Example 6, except that 4.00 g. of $Fe_2O_3$ was added.

EXAMPLE 9

60% [$SbMo_3V_{0.1}O_x + W°_{0.06}$] + 40% $SiO_2$ — This catalyst was prepared refluxing a slurry containing 108 g. $MoO_3$, 2.27 g. $V_2O_5$, 2.76 g. of W° metal powder and 99.6 g. of solid diatomaceous silica for two hours. To this product 36.4 g. of $Sb_2O_3$ was added and the mixture was refluxed for 2 hours. The catalyst was recovered and activated as described above.

EXAMPLE 10

60% [$SbMo_3V_{0.1}O_x + Mo°_{0.06}$] + 40% $SiO_2$ — This catalyst was prepared in the same manner as shown by Example 9, except that the tungsten metal was replaced by 1.44 g. of molybdenum metal powder.

The results of the use of these catalysts to convert butadiene to maleic anhydride (MAA) and acrylic acid (AA) is summarized in Table I. The usable acid is the sum of the maleic anhydride plus acrylic acid.

EXAMPLE 11

Life Test of $SbMo_3V_{0.1}O_x + W°_{0.06}$ — The catalyst of Example 1 was run in the reactor continuously for a period of 568 hours. During the entire period, the per pass conversion to total titratable acid was maintained at a high level. At the end of the test, the per pass conversion to total acid was 73.2%. Of this per pass conversion, 68.9% was to maleic anhydride. Thus, even after long periods of operation, the catalysts of the invention have excellent activity in the preparation of maleic anhydride.

In the same manner as shown by the examples above, other catalysts of the invention, for example $Sb_4Mo_9V_{0.5}O_x$, $Sb_9Mo_9VO_x$, $SbMoFe_{0.02}O_x$, $Sb_5Mo_3V_{0.2}FeO_x + Al°_{0.5}$, $SbMo_9Fe_{0.5}O_x + Ni°_{0.1}$, and $Sb_9Mo_2V_{0.3}Fe_{0.06}Mg_{0.2}O_x + Mo°_{0.2}$, are employed in the conversion of 1,3-butadiene to maleic anhydride and acrylic acid.

Also in the same manner as shown for the reactions of 1,3-butadiene, other reactants, such as n-butenes, crotonaldehyde or furan are contacted with the catalysts of the present invention in the presence of molecular oxygen to obtain maleic anhydride.

We claim:

1. In the process for preparing maleic anhydride by contacting 1,3-butadiene and molecular oxygen with an oxidation catalyst at a temperature of about 250° to about 600°C. the improvement comprising:

using as the oxidation catalyst a catalyst containing

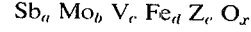

$$Sb_a\ Mo_b\ V_c\ Fe_d\ Z_e\ O_x$$

wherein Z is a metal or an oxide of molybdenum, tungsten, magnesium, aluminum and nickel and wherein $a$ and $b$ are numbers from about 1 to about 9, $c$, $d$ and $e$ are numbers from 0 to about 1, $c + d$ is not zero and $x$ is a number which satisfies the valence requirements of the other elements present 2. The process of claim 1 wherein $c$ is about 0.01 to about 0.5.

3. The process of claim 1 wherein $d$ is about 0.01 to about 0.5.

4. The process of claim 1 wherein both $c$ and $d$ are numbers of about 0.01 to about 0.5.

5. The process of claim 1 wherein Z is added to the catalyst as molybdenum or tungsten metal.

6. The process of claim 5 wherein $a$ and $b$ are numbers of about 2 to about 8 and $e$ is 0.001 to about 0.2.

7. The process of claim 6 wherein both $c$ and $d$ are numbers of about 0.01 to about 0.5.

TABLE I

Comparison of Catalysts of the Invention to the Base Sb-Mo Catalyst

| Example | Catalyst | Air/BD | Per Pass Conversion, % | | |
|---|---|---|---|---|---|
| | | | MAA | AA | Usable Acid |
| Comp. A | $SbMo_3O_x + W°_{0.06}$ | 22 | 68.5 | 6.0 | 74.5 |
| 1 | $SbMo_3V_{0.1}O_x + W°_{0.06}$ | 22 | 68.4 | 9.1 | 77.5 |
| 2 | $SbMo_3V_{0.2}O_x + W°_{0.06}$ | 22 | 65.4 | 12.3 | 77.7 |
| 3 | $SbMo_3Fe_{0.1}O_x + W°_{0.06}$ | 22 | 67.7 | 6.4 | 74.1 |
| 4 | $SbMo_3Fe_{0.1}O_x + W°_{0.06}$ | 17.3 | 65.9 | 6.4 | 72.3 |
| 5 | $SbMo_3Fe_{0.3}O_x + W°_{0.06}$ | 17.2 | 68.6 | 5.4 | 74.0 |
| 6 | $SbMo_3Fe_{0.1}V_{0.1}O_x + W°_{0.06}$ | 17.2 | 70.2 | 8.8 | 79.0 |
| 7 | $SbMo_3Fe_{0.2}V_{0.1}O_x + W°_{0.06}$ | 17.5 | 70.0 | 7.3 | 77.3 |
| 8 | $SbMo_3Fe_{0.2}V_{0.1}O_x + W°_{0.06}$ | 18.4 | 75.0 | 4.2 | 79.2 |
| 9 | 60% [$SbMo_3V_{0.1}O_x + W°_{0.06}$] + 40% $SiO_2$ | 23 | 72.8 | 2.8 | 75.6 |
| 10 | 60% [$SbMo_3V_{0.1}O_x + Mo°_{0.06}$] + 40% $SiO_2$ | 22 | 73.7 | 0 | 73.7 |

8. The process of claim 1 wherein the temperature is about 325° to about 450°C.

9. The process of claim 1 wherein the catalyst is prepared by
   a. reacting an aqueous slurry containing at least molybdenum oxide with a reducing agent capable of reducing $Mo^{+6}$ to obtain a slurry having a bluish color;
   b. reacting the product of step (a) with antimony oxide to obtain a slurry having a darker color; and
   c. recovering a solid catalyst from the mixture formed in step (b).

10. The process of claim 1 wherein at least some of the molybdenum in the catalyst is in a valence state below +6.

* * * * *